United States Patent [19]
Yoshida et al.

[11] 3,933,547

[45] Jan. 20, 1976

[54] METHOD FOR FIXING A PATTERN DESCRIBED ON THE SURFACE OF THERMOPLASTIC RESIN ARTICLES

[75] Inventors: Masafumi Yoshida; Akira Esaka, both of Iwaki, Japan

[73] Assignee: Kureha Kagaku Kogyo Kabushiki Kaisha, Tokyo, Japan

[22] Filed: Feb. 11, 1974

[21] Appl. No.: 441,392

[30] Foreign Application Priority Data
Feb. 14, 1973 Japan................................ 48-17513

[52] U.S. Cl. ................. 156/77; 156/145; 156/229; 156/277; 427/224; 428/203; 428/315; 428/516
[51] Int. Cl.²..................... B32B 31/20; B32B 31/26
[58] Field of Search ......... 156/62, 63, 77, 219, 229, 156/277, 278, 280, 303.1, 311, 82, 81, 160, 163, 164, 306, 145; 117/118, 62, 98; 161/159, 146, 160; 264/321, DIG. 8, 395, 289, DIG. 73; 428/203, 315, 516; 427/224

[56] References Cited
UNITED STATES PATENTS

| | | | |
|---|---|---|---|
| 3,410,748 | 11/1968 | Blue....................................... | 156/82 |
| 3,503,177 | 3/1970 | Kropscott et al. .................. | 264/321 |
| 3,649,331 | 3/1972 | Peterson et al. .................... | 264/321 |
| 3,716,437 | 2/1973 | Newman et al. .................... | 156/298 |
| 3,752,695 | 8/1973 | Finelli .................................. | 117/98 |
| 3,783,088 | 1/1974 | Yoshiyasu et al. .................. | 156/229 |
| 3,829,343 | 8/1974 | Remmert .............................. | 156/82 |
| 3,830,895 | 8/1974 | Theodorsen ........................ | 264/321 |

*Primary Examiner*—William A. Powell
*Assistant Examiner*—Jerome W. Massie
*Attorney, Agent, or Firm*—Kemon, Palmer & Estabrook

[57] ABSTRACT

Patterns described with inks or colors on the surface of thermoplastic resin articles having an interconnected fine open-cell structure in the surface layer thereof are rendered durable without displacement or deformation by heating under pressure the pattern described surface to a higher temperature than that at which said thermoplastic resin becomes fluid to cover the pattern-bearing surface with a thin film formed from the original resin constituting said surface layer.

8 Claims, No Drawings

METHOD FOR FIXING A PATTERN DESCRIBED ON THE SURFACE OF THERMOPLASTIC RESIN ARTICLES

This invention relates to a method for fixing a pattern consisting of figures, letters, marks, partially or totally colored pictures or mixtures thereof described on a surface of thermoplastic resin articles and especially on a sheet or film of said resin.

The surface of many thermoplastic resin articles generally has so low stickiness to printing colors or inks that a pattern formed on said surface by pencilling, brushing, spraying, printing or stamping is often easily erased or scratched simply by rubbing.

On the other hand, a thermoplastic resin article whose surface is formed of fine interconnected cells, that is, a fine open-cell structure, enables the printing colors or inks to penetrate said interconnected cells rendering a pattern described on said surface relatively durable. However, a pattern described on said surface does not present a beautiful finish but a rough one. To date, therefore, the protection of the described pattern and the lustering of the pattern-bearing surface have been effected by mounting another thin sheet of thermoplastic resin on the pattern-bearing surface, or varnish a latex liquor thereon, followed by drying. However, such operations have the drawback of consuming a great deal of time and work and consequently requiring considerable cost.

It is accordingly the object of this invention to provide a simpler method of protecting a pattern formed on the surface of thermoplastic resin articles and lustering the pattern-bearing surface.

The object can be attained by the method of this invention which comprises impressing a pattern with inks or colors on a surface of a thermoplastic resin article, the surface layer of which has a fine open-cell structure, and heating under pressure the pattern-bearing surface to a higher temperature than the temperature at which said resin becomes fluid so as to cover the pattern with a thin film which is formed from the original resin constituting the surface layer of said articles.

The term "impressing" signifies any of the aforesaid processes of pencilling, brushing, spraying, printing and stamping.

The material used for impressing penetrates the interconnected cells in the surface layer of a thermoplastic resin article and is affixed thereto. When heated under pressure, part of the resin constituting this surface layer of the article melts so as to provide a thin film, which in turn quickly covers the whole of the impressed pattern. This thin film prevents the impressed pattern from being peeled off the surface of the article, and moreover imparts a lustrous and beautiful appearance to the pattern-bearing surface.

A thermoplastic resin article whose surface layer has a fine open-cell structure can be prepared, for example, by any of the following known methods.

1. Sintering powders of thermoplastic resin.
2. Bonding adhesive fibers of thermoplastic resin.
3. Incorporating a foaming agent.
4. Gelatinating a thermoplastic resin using such a solvent as is capable of dissolving said resin at a high temperature but gelatinating said dissolved resin at a low temperature, followed by removing the solvent.
5. Mixing a thermoplastic resin with a powdered substance in a solvent which is capable of dissolving said powdered substance but incapable of dissolving said resin; melting the mixture into a shape; and removing the powdered substance from the shaped article using said solvent.
6. Stretching a resin article consisting of a mixture of thermoplastic resin and another substance insoluble therein at room temperature, thereby forming fine cracks at the interface between the resin and the substance thus mixed.
7. Laminating two thermoplastic resin sheets, one of which contains a large amount of incompatible substance at room temperature and the other of which contains no such incompatible substance; and stretching said laminated sheets so as to form a fine open-cell structure in said one sheet containing a large amount of incompatible substance.

Generally, a thermoplastic resin article used in the method of this invention has its surface layer containing therein interconnected fine cells. To render the surface layer more effective to attain the object of this invention, it is desired to use a thermoplastic resin article whose above-mentioned surface layer contains in the fine open-cell structure a fine filler of inorganic substance. A suitable content of the filler in the fine open-cell structure thermoplastic resin layer is from 30 to 90 % by weight based on the resin compound of the layer. The surface layer of the resin article which contains such a large amount of inorganic filler becomes rough and admits easy pencilling thereon, though the glassy surface of an ordinary resin article is not substantially adapted for any pencilling. Further, oil-based ink has a greater affinity with thermoplastic resin than water-based ink, whereas an inorganic substance generally has a great affinity with water-based ink. Therefore, the interface between the resin and the filler has good affinity with both oil- and water-based inks, thereby enabling a pattern to be impressed on the surface of said resin article with any kind of ink.

When the pattern-bearing surface of the resin article is heated under pressure, the inorganic filler mixed with the resin does not melt. Accordingly, the printing ink which has penetrated between the resin and filler is not displaced, namely, the impressed pattern is not deformed but remains fixed in place when the pattern is covered with a thin film thermally form from the original resin constituting the pattern-bearing surface layer.

When heated, thermoplastic resin itself displays free fluidity. When the thermoplastic resin is compressed by heating rolls, the melted surface layer thereof is removed, and the freshly exposed surface is successively contacted by the heating rolls. Further, other resin layers than the one which has commenced flowing due to heat and pressure are also heated by the latter, as that melting is ready to extend to other parts than the surface layer of the resin. Where, however, the resin surface layer contains a large amount of inorganic material, this inorganic material obstructs the extension of fusion and limits said fusion to the surface, thus keeping the printed pattern distinctly visible.

Furthermore, where a resin article having an open-cell structure but free from inorganic filler has its surface heated under pressure, the article is readily subjected to thermal shrinkage or deformation. However, presence of a large amount of inorganic substance substantially suppresses said thermal shrinkage or deformation.

Formation of fine open-cell structure in the thermoplastic resin can be attained by adding a large amount of inorganic filler to said resin during manufacture. Production of such thermoplastic resin articles is most preferably effected by the aforesaid process No. 6 or No. 7. In the case of the process No. 6, stretching of a thermoplastic resin article containing a large amount of inorganic filler provides a fine open-cell structure. In this case, the molded resin article is cooled for solidification, and thereafter stretched at a hot and lower temperature than the temperature at which the resin becomes fluid, thereby giving rise to peeling in the interface between the resin and filler.

Sometimes, however, a fine clearance naturally appears throughout the interface between the resin and filler, depending on the degree of the mutual affinity between the resin and filler, the particle size of fine filler, the mixed proportions of resin and filler and the mechanical strength of the resin. At other times, where a molded resin article is subjected to ordinary stretching simply by tension, peeling is difficult to take place in the interface between the resin and filler, causing the molded article to be easily broken by ununiform stretching before the growth of fine-open cell structure. In the latter case, uniform stretching can be attained by adding a small amount of lubricant or surface-active agent to the thermoplastic resin when a sheet is molded therefrom so as to decrease the mutual affinity between the resin and filler. Another process of forming fine open-cell structure consists in imparting a slight deformation to the molded article before it is stretched by tension, giving rise to peeling throughout the interface between the resin and filler for formation of cracks, and thereafter stretching the molded article by tension to enlarge the cracks. Slight deformation of molded article can be effected by slightly stretching the article by rolls or applying a uniform bending stress to the article.

According to the aforementioned process No. 7, the object of this invention is attained by laminating two sheets of thermoplastic resin, one of which contains a large amount of fine inorganic filler, and the other of which contains no filler; stretching the laminate; impressing a pattern with inks or colors on the surface of said inorganic filler containing sheet; and heating under pressure the pattern-bearing surface in the same manner as previously described.

For this invention, it is an indispensable requisite that the surface layer of a molded article of thermoplastic resin be formed of an open-cell structure. Where the surface layer of the article has a closed-cell structure, printing ink can not penetrate such closed cells. Consequently, where the surface of the article is heated after a pattern is impressed thereon, then the ink excessively spreads over the surface, failing to provide a distinct pattern. In contrast, where the surface layer of the resin article is formed of open-cell structure, the gas in the open cells easily escapes to the outside through passageways interconnecting said open cells even when the gas is expanded by the heating of the resin article surface, thereby preventing a thin film thermally formed from the original resin from being deformed and providing a mirror-like covering for an impressed pattern.

Thermoplastic resins capable of forming open-cell structure include, for example, polyethylene, polypropylene, polyvinyl chloride, a copolymerizate of vinylidene chloride, polyamide, polyester, a trimer of acrylonitrile - butadienestyrene, polyvinyl fluoride, polyvinylidene fluoride, polymethymetacrylate, a polyacrylonitrile copolymerizate, a copolymerizate of vinyl acetate.

Inorganic filler materials used in this invention include natural minerals such as talc, clay, limestone, sand, silica sand, perlite and vermiculite; metals such as iron, aluminum, and copper; and inorganic ompounds such as calcium sulfate, calcium sulfite, magnesium carbonate, iron oxide, aluminum oxide, copper oxide, iron hydroxide and aliminium hydroxide. These filler materials are desired to have a particle size ranging from 0.1 to 200 microns, preferably from 0.5 to 100 microns.

The pattern-bearing surface of the aforesaid thermoplastic resin article may be heated by placing a heavy hot plate or roll thereon, rolling the article after heating the surface with hot gas or radiant heat, or hot-pressing the article.

As mentioned above, an impressed pattern treated by the method of this invention has a lustrous smooth surface. Further, it is covered with a thin film formed from the original resin constituting the pattern-bearing surface of a resin article, and so the impressed pattern is never damaged or erased by friction, and furthermore it holds semipermanent resistance to weathering. Since it is impossible to erase any part of printed letters or marks treated by the method of this invention, it is of special interest where said method is applied in providing important documents, bills, identification cards or certificates. Further, the surface of a thermoplastic resin article obtained by the method of this invention has great waterproofness, rendering said method favorably acceptable in preparing posters, advertisements or the like.

The method of this invention will be more fully understood by reference to the following examples.

EXAMPLE 1

Thirty parts by weight of polyethylene having a melt index of 0.3 and 70 parts by weight of powders of aluminum hydroxide having a particle size of 5 to 7 microns were homogeneously mixed. The mixture was melt-processed into a sheet 1.5 mm thick. The sheet was uniaxially stretched to a size 1.2 times the original shape. Thereafter the sheet was extended 2.5 times lengthwise and crosswise in an air bath at 90°C, to obtain a sheet having open-cell structure with an apparent density of 0.52 g/c.c. The thickness of the sheet could be kept uniform throughout the above-mentioned stretching operation.

A pattern was painted with water colors on one surface of the white sheet obtained. After the painting was dried, the sheet was hot-pressed about 20 seconds at a pressure of 30 Kg/cm$^2$ and a temperature of 180°C between pressing plates separated 1.3 mm from each other. Thereafter the sheet was cooled to room temperature. The pattern-bearing surface of the sheet was covered with a thin film about 70 microns thick formed from the original resin constituting said pattern-bearing surface layer. Thus the water-color painting could be observed through said transparent thin polyethylene film without any loss of distinctness.

EXAMPLE 2

Forty parts by weight of a resin compound consisting of 95 percent by weight of a copolymerizate having a polymerization ratio of 1 mol of vinyl chloride and 9 mols of vinyl acetate, 3 percent by weight of organotin stabilizer and 2 percent by weight of stearic acid as a lubricant, and 60 parts by weight of ground calcium carbonate were homogeneously mixed, followed by pelletizing. The pellets were melted at 190°C and extruded through a T-die extruder into a continuous sheet 0.8 mm thick. The sheet was uniaxially stretched to a size 1.2 times the original shape by press rolls, and further uniaxially extended four times in a hot dome at 100°C, obtaining a continuous white sheet which had an open-cell structure.

A picture was drawn on one side of a cut portion of the white sheet with red, blue and yellow color pencils. The sheet was conducted between two rollers, one of which, contacted to the figure-bearing surface of the sheet, was heated to 180°C. The resin constituting the picture-bearing surface layer of the sheet was partially melted, followed by cooling. As the result, said picture-bearing surface was covered with a thin film about 50 microns thick thermally formed from the original resin, offering the same effect as in Example 1.

EXAMPLE 3

A homogeneous mixture of 70 parts by weight of polypropylene having a melt index of 0.3, 30 parts by weight of aluminum hydroxide having a particle size of about 17 microns, and 5 parts by weight of liquid paraffin as a lubricant was extruded into pellets through an extruder whose mold was maintained at about 190°C. the pellets were thermally molded by an extrusion molding machine at 200°C into a tubular form by means of mandrel forming. The tube obtained was cooled by a cooling roll. The tube was cut open into a film, which in turn was uniaxially stretched to a size 5 times the original shape in a hot water tank at 80°C. After drying, the film was cut into several sheets 0.6 mm thick having an open-cell structure. A pattern was impressed on both sides of each sheet with water-base ink by means of a rotary press. After the pattern was dried, the sheet was passed between two rolls at 180°C. The pattern-bearing surfaces of each sheet were covered with a thin film formed from the original resin. After cooled, the pattern-bearing surfaces of all the sheets displayed the same effect as in Example 1.

EXAMPLE 4

A homogeneous mixture of 40 parts by weight of a resin compound consisting of 90 percent by weight of polyvinyl chloride, whose mean degree of polymerization is 1060, 9 percent by weight of dioctyl phthalate as a plasticizer and 1 percent by weight of dibutyltin sulfide as a stabilizer and 60 parts by weight of fine powders of common salt having a particle size ranging from 40 to 70 microns was melted and pressed into a sheet 1 mm thick. The sheet was immersed overnight in running water to dissolve the common salt contained in the sheet. Upon drying, a white sheet, which had an open-cell structure, with an apparent density of 0.65 g/c.c. was obtained.

A seal impression was made on the surface of the sheet with red water-base ink by means of a rubber stamp and numerals were recorded on said surface by a fountain pen containing black ink. The sheet was hot pressed about 10 seconds at a pressure of 20 Kg/cm$^2$ and a temperature of 180°C between two press plates separated 0.9 mm from each other, and thereafter cooled to room temperature. In this case, the sheet somewhat shrank, resulting in the slight deformation of the impressed pattern. However, the pattern presented the same fastness and luster as in the preceding examples.

EXAMPLE 5

A homogeneous mixture of 30 parts by weight of polypropylene having a melt index of 0.3 and 70 parts by weight of hemihydrated calcium sulfite having particle sizes ranging from 10 to 20 microns was melted and pressed into a sheet 2 mm thick. The sheet was uniaxially stretched to a size 4 times the original shape in an air bath at 80°C and thereafter immersed overnight in a 10% aqueous solution of hydrochloric acid to dissolve out the calcium sulfite followed by water washing. As the result, a sheet was obtained which was formed of an open-cell structure with an apparent density of about 0.45 g/c.c. The sheet which displayed a relatively large thermal shrinkage was thermally set 10 minutes at 120°C in a frame. After cooled, the sheet was taken out from the frame and a poster picture was drawn on the surface of the sheet with red and black water-base inks. After the painting was dried, the sheet was hot-pressed about 15 seconds at a pressure of 20 Kg/cm$^2$ and a temperature of 190°C between press plates separated 1.8 mm from each other, followed by cooling to room temperature. The interconnected cells of the open-cell structure formed in the picture-bearing surface layer of the sheet was somewhat contracted by hot pressing, giving rise to the slight deformation of the impressed figure. However, the luster of the picture-bearing surface of the sheet and the fastness of the drawn figure did not change at all from what was observed in the preceding examples.

EXAMPLE 6

A homogeneous mixture of 40 parts by weight of polyethylene having a melt index of 0.3 and 60 parts by weight of ground calcium carbonate having particle sizes ranging from 1 to 10 microns was melted and pressed into a sheet 1.0 mm thick. Another sheet was prepared from ethylene-vinyl acetate copolymer of 0.2 melt index containing 8 percent by weight of vinyl acetate. These two sheets were laminated by hot-pressing. The laminate was uniaxially stretched to a size 4.5 times the original shape in a tank of hot water at 80°C. The sheet obtained after drying was 0.9 mm thick and had an apparent density of 0.65 g/c.c. with one surface formed of open-cell structure.

A picture was drawn on the open-cell structure surface with an oil-base ink. After the painting was dried, the painted surface was heated by a hand roll whose surface temperature was maintained at 160°C, followed by cooling. The luster of the painted surface of the sheet and the fastness of the painted picture did not change at all from what was observed in the preceding examples.

What we claim is:

1. A method of forming a thermoplastic resin article having a pattern durably described on a surface thereof which comprises impressing a pattern with inks or colors on the surface of a thermoplsatic resin article, said surface having a fine interconnected open-cell structure and heating under pressure the pattern-bearing surface to a temperature above the melting point of said thermoplastic resin so as to cover the pattern-bearing surface with a thin film layer of resin formed from the original surface layer resin of the article.

2. The method of claim 1 wherein said pattern is impressed on said surface by pencilling, brushing, spraying, printing or stamping.

3. The method of claim 2 wherein said article is a sheet.

4. The method of claim 3 wherein said sheet is a laminate of two sheets of different thermoplastic resins.

5. A method for fixing a pattern described on a surface of thermoplastic resin sheet, which comprises stretching a thermoplastic resin composition sheet containing 30 to 90 percent by weight of finely divided inorganic filler based on the weight of resin composition sheet so as to form a fine interconnected open-cell structure in the stretched sheet; impressing a pattern with inks or colors on the surface of said stretched sheet; and heating under pressure the pattern bearing surface to a temperature above the melting point of said thermoplastic resin so as to cover the pattern-bearing surface with a thin film of resin formed from the original surface layer resin of the sheet.

6. The method of claim 5 wherein the thermoplastic resin sheet contains a small amount of additives capable of decreasing mutual affinity between the resin and the filler.

7. A method of forming a thermoplastic resin article having a pattern durably described on a surface thereof, said article being a laminate consisting of first and second sheets of different thermoplastic resins, the first sheet containing a finely divided inorganic filler in an amount between 30 to 90 percent by weight based on the weight of said first sheet and the second sheet containing no filler, which comprised stretching the laminate so as to form a fine interconnected open-cell structure in the first sheet of stretched laminate; impressing a pattern with inks or colors on the surface of said first sheet; and heating under pressure the pattern-bearing surface to a temperature above the melting point of the first sheet resin so as to cover the pattern-bearing surface with a thin film layer of the resin of the first sheet.

8. The method of claim 7 wherein the first sheet contains a small amount of additives capable of decreasing mutual affinity between the resin and the filler.

* * * * *